United States Statutory Invention Registration [19]

[11] Reg. Number: H701

Ancheta [43] Published: Nov. 7, 1989

[54] TWO CYCLE INTERNAL COMBUSTION ENGINE

[76] Inventor: Antonio D. Ancheta, 446 Toronto Street, Winnipeg, Manitoba, Canada, R3G 1S5

[21] Appl. No.: 282,638

[22] Filed: Dec. 12, 1988

[51] Int. Cl.[4] ..... F02B 25/04

[52] U.S. Cl. ..... 123/65 VB

[56] References Cited

U.S. PATENT DOCUMENTS 4,399,778 8/1983 Ancheta ..... 123/65 VB 4,576,126 3/1986 Ancheta ..... 123/65 BA

*Primary Examiner*—Deborah L. Kyle

*Assistant Examiner*—Michael J. Carone

[57] ABSTRACT

A two-stroke engine includes an intake-and-scavenge valve in the cylinder head together with a gasoline fuel injection system, a recirculating type constant pressure lubricating system, and a blower or turbo charger combination assisting in charging the cylinder with air and also assisting in scavenging the exhaust gases. The piston head is domed with one side curving downwardly towards the exhaust port formed through the wall of the cylinder above the bottom dead center position of the piston head. The exhaust port slopes outwardly and downwardly following generally the slope of the piston to facilitate the flow of exhaust gases therethrough assisted by the scavenging air entering through the inlet-and-scavenger valves. The valve is operated by a cam mounted on a camshaft upon the cylinder head which in turn is operatively connected to the crankshaft. The shape of the cam lobe is such that it controls the opening, closing and duration of opening of the valve with the valve being opened approximately 153° and with the piston controlling the opening of the exhaust port through approximately 160°. The inlet valves open approximately 10° after the exhaust port opens and closes approximately 3° after the exhaust port is covered. It should be noted that the oil scraper ring remains below the exhaust port at all times to prevent lubricating oil from escaping through the exhaust port. In gasoline engines, metered, atomized gasoline fuel is injected by fuel injectors installed at the scavenging valve ports a few degrees before the scavenging valves close. The atomized fuel is mixed with the fresh air charge entering the cylinder to be compressed.

20 Claims, 3 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

DURATION OF VALVE OPENING 153°

DURATION OF EXHAUST PORT OPENING 160°

TWO CYCLE INTERNAL COMBUSTION ENGINE

BACKGROUND

The applicant's U.S. Pat. No. 4,399,778 describes a method of operating a two-stroke or two cycle high torque and high speed gasoline or diesel fueled multi-cylinder internal combustion engine utilizing an air blower or turbo charger combination connected in series, and having a new and improved design of the internal moving parts, more specifically the scavenging valves which are opened and closed by the wide area of cam lobes of a cam shaft and related mechanisms all assembled in the cylinder head. Also of importance is the piston assembly having a novel feature of design. A recirculating type constant pressure lubrication system is used to lubricate all the vital and critical moving parts, making this invention an efficient device.

SUMMARY

It is an object of this invention to provide an improved valve and exhaust port timing in a gasoline operated engine of this type.

In accordance with one aspect of the invention there is provided, in a two-stroke supercharged multi-cylinder internal combustion engine, with inline or V-type configuration and including a constant pressure lubrication system; comprising in combination a cylinder block having cylinder bores formed therein, a cylinder head on the upper end of the cylindrical bores and closing same and defining a combustion chamber at the upper end of each cylindrical bore, a piston assembly in each of said bores including a piston having a domed head and a connecting rod operatively connected to said piston for reciprocating same between top dead centre and bottom dead centre, a crankshaft mounted for rotation at the base of said block, said connecting rods being operatively connected to said crankshaft and an oil pan enclosing the lower end of the cylinder bores and said crankshaft, said cylinder head including a camshaft mounted for rotation thereon and being operatively connected to said crankshaft, at least two inlet-and-scavenger valves mounted on said cylinder head and being operatively connected with said combustion chamber of each of said cylindrical bores, a rocker arm operatively mounted on said cylinder head and operatively engaging said inlet-and-scavenger valve by one end thereof, a cam lobe for each rocker arm formed on said cam shaft operatively connected with the other end of said rocker arm, said cam lobes having a wide area of contact with said rocker arm to control the opening, closing and duration of opening of said inlet-and-scavenger valve and exhaust port located in the lower side of the cylinder walls of the cylinder bores inclining downwardly and outwardly through the cylinder walls and being covered and uncovered by the reciprocating piston passing thereby, the improvement wherein the cam lobe opens said inlet-and-scavenger valve at approximately 110° after top dead centre and closes said inlet-and-scavenger valves at approximately 83° after bottom dead centre thereby maintaining said inlet-and-scavenger valve open through approximately 153°.

In accordance with another aspect of the invention there is provided, in a two-stroke supercharged multi-cylinder internal combustion engine, with inline or V-type configuration and including a constant pressure lubrication system; comprising in combination a cylinder block having cylinder bores formed therein, a cylinder head on the upper end of the cylindrical bores and closing same and defining a combustion chamber at the upper end of each cylindrical bore, a piston assembly in each of said bores including a piston having a domed head and a connecting rod operatively connected to said piston for reciprocating same between top dead centre and bottom dead centre, a crankshaft mounted for rotation at the base of said block, said connecting rods being operatively connected to said crankshaft and an oil pan enclosing the lower end of the cylinder bores and said crankshaft, said cylinder head including a camshaft mounted for rotation thereon and being operatively connected to said crankshaft, at least two inlet-and-scavenger valves mounted on said cylinder head and being operatively connected with said combustion chamber of each of said cylindrical bores, a rocker arm operatively mounted on said cylinder head and operatively engaging said inlet-and-scavenger valves by one end thereof, a cam lobe for each rocker arm formed on said camshaft operatively connected with the other end of said rocker arm, said cam lobes having a wide area of contact with said rocker arms to control the opening, closing and duration of opening of said inlet-and-scavenger valves and exhaust port located in the lower side of the cylinder walls of the cylinder bores inclining downwardly and outwardly through the cylinder walls and being covered and uncovered by the reciprocating piston passing thereby, the improvement wherein the piston uncovers said exhaust port approximately 100° after top dead centre and covers said exhaust port approximately 80° after bottom dead centre whereby said exhaust port is opened through approximately 160°.

In preferred embodiments, both improvements are used, so that the inlet-and-scavenger valves open approximately 10° after the exhaust port is uncovered and close approximately 3° after the exhaust port is covered.

DESCRIPTION OF THE DRAWINGS

In the drawings like characters of reference indicate corresponding parts in the different figures.

DETAILED DESCRIPTION

Figure 1:
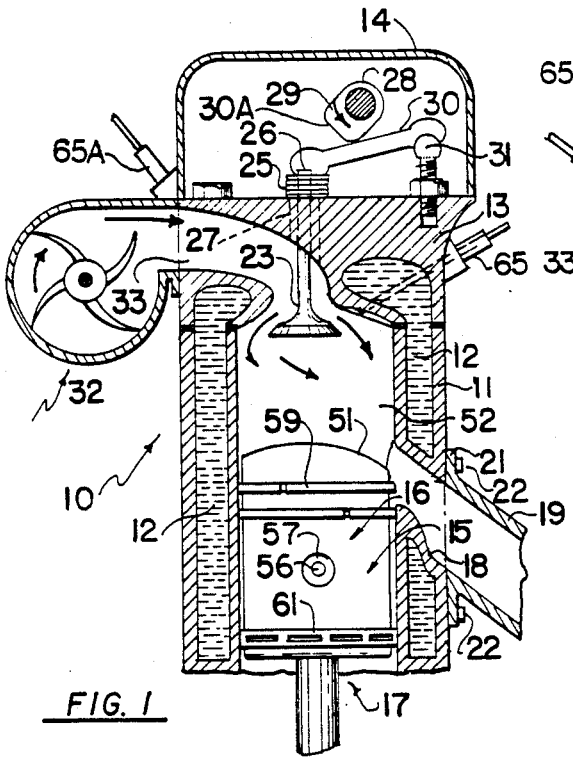
FIG. 1 is a schematic partially sectioned side elevation of one cylinder and a piston assembly showing the piston position in the latter part of the power stroke with the exhaust port and the scavenging valves or intake valves already partly opened.

Proceeding therefore to describe the engine in detail, reference should first be made to FIGS. 1 to 4 in which reference character 10 illustrates generally a cylinder including a cylinder wall 11, water cooling passages 12 formed therein and a cylinder head assembly 13 secured to the upper side of the cylinder by conventional means (not illustrated).

A valve casing 14 surmounts the cylinder head and is once again connected by conventional means not shown.

A piston assembly is reciprocal within said cylinder, said piston assembly being generally designated by reference character 15 and including a piston collectively designated 16 and a connecti.ng rod collectively designated 17, details of which will hereinafter be described An exhaust port 18 is formed through the wall of the cylinder 11 on one side thereof, said exhaust port preferably being of rectangular configuration and inclining downwardly and outwardly through the walls of the cylinder as clearly shown in FIGS. 1 to 4.

An exhaust conduit 19 leading to an exhaust manifold 20 (see FIG. 6) is secured to the exhaust port on the outer side thereof by means of flange 21 and bolts 22 and this exhaust conduit 19 extends outwardly and downwardly at an inclined angle similar to the inclined angle of the exhaust port through the cylinder wall 11 to facilitate the exit of exhaust gases as will hereinafter be described.

At least one and preferably two or more air intake and scavenging valves 23 are provided within the cylinder head 13 normally seated on valve seats 24 and being retained therein by means of valve springs 25 on the upper ends 26 of the valve stems which engage through valve guides 27 within the head 13 in a conventional manner.

These valves are preferably operated by an over head cam shaft 28 supported for rotation in a conventional manner (not illustrated) and being operatively connected to the crankshaft (not illustrated) which is also conventional.

However, the cam lobes 29 of the cam shaft are shaped with a wide contact area 30A to control the duration of the opening of the air intake valves 33 and also the time that they are opened and closed.

The cam lobes 29 engage rocker arms 30 pivoted by one end thereof to rocker arm bearings 31 and engaging the upper ends 26 of the valve stems by the other ends 32A in a conventional manner.

In FIGS. 1 to 4, an air blower assembly collectively designated 32 is provided and is operatively connected to the engine in a conventional manner to supply air under superatmospheric pressure to the air inlet valve 23 via passages 33 which may be connected to an intake manifold if a plurality of pistons and cylinders are utilized.

Figure 8:
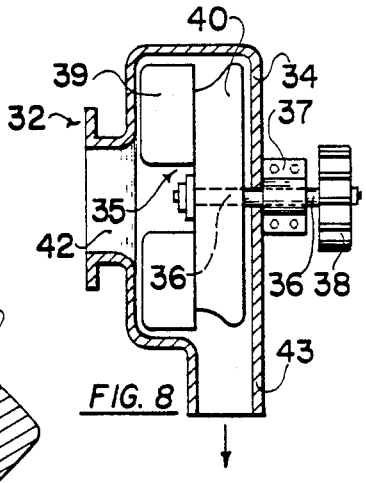
FIG. 8 is a fragmentary cross sectional view of the preferred air blower construction.
Figure 9:
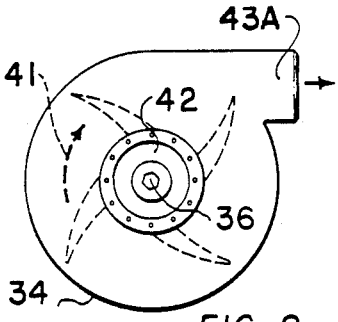
FIG. 9 is a view from the left hand side of FIG. 8.

Details of the preferred embodiment of the air blower assembly are shown in FIGS. 8 and 9 and comprises a cylindrical casing 34 within which a fan blade assembly collectively designated 35 is supported for rotation upon a shaft 36 supported with bearings 37 and driven from the engine by means of gear 38 or gear belt (not illustrated) either of which is operatively connected to the cam shaft in a conventional manner by means of a gear chain or cog belt.

The blower includes the aforementioned combination fan assembly 35 with an outer set of impeller blades 39 and an inner set of screw or compressor blades 40. Rotation of the fan assembly in the direction of arrow 41, draws air through the central intake 42 in the centre of the front wall of the casing, compresses same and ejects it from the discharge end 43 which is operatively connected to the air intake valves 23 as hereinafter described.

Figure 5:
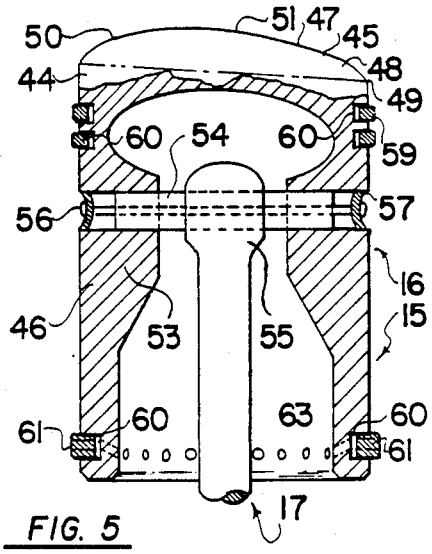
FIG. 5 is a fragmentary cross sectional view of the piston and connecting rod assembly per se.

Reference should be made to the piston assembly illustrated in detail in FIG. 5. The piston is preferably formed from aluminum alloy and includes a piston head 44, a piston head crown 45 and a surrounding cylindrical skirt portion 46.

The piston crown 45 is domed as illustrated by reference character 47 and is convexly curved with the side of the crown 48 towards the exhaust port 18 curving down to a point 48 which is lower than the junction of the crown to the head on the opposite side as illustrated by reference character 50 so that the apex 51 of the dome is offset from the vertical centre line of the piston, towards the side 50 which is diametrically opposite to the lower side 49 on the exhaust port side of the cylinder when assembled.

This facilitates the flow of exhaust gases from the combustion chamber 52 assisted by the air entering via the blower assembly 32.

A pair of opposed piston bosses 53 are formed with in the wall of the piston in a conventional manner and a wrist pin 54 bearingly engages these bosses and also bearingly engages the wrist pin end 55 of the connecting rod 17.

It is desirable to seal the outer ends of the bosses 53 to prevent lubricating oil from being discharged therethrough and in this connection a tie rod or pin 56 extends freely through the wrist pin 54 which is hollow, and is secured as by brazing two concave sealing end caps 5,7 one being situated slightly within each outer end 58 of the wrist pin bosses of the piston as clearly shown.

A pair or more of compression piston rings 59 are seated within the piston ring grooves 60 around the piston adjacent the upper end of the head thereof and an oil scraper ring 61 is installed within an annular groove 62 adjacent the base of the skirt of the piston with oil return apertures 63 being formed through the skirt at the base of the groove in a conventional manner.

Of importance is the fact that the oil scraper ring always remains below the lower side 18A of the exhaust port when the piston is in the top dead centre position illustrated in FIG. 4.

The exhaust port 18 design is such that it inclines downwardly and outwardly on the walls of the cylinder and the attaching exhaust conduit is preferably rectangular in configuration and may be provided with one or more vertical bars 64 to guide the compression rings past the exhaust port and to prevent them catching on the edges of the walls defining the port.

In operation to this point, reference should be made to FIGS. 1 to 4.

Figure 2:
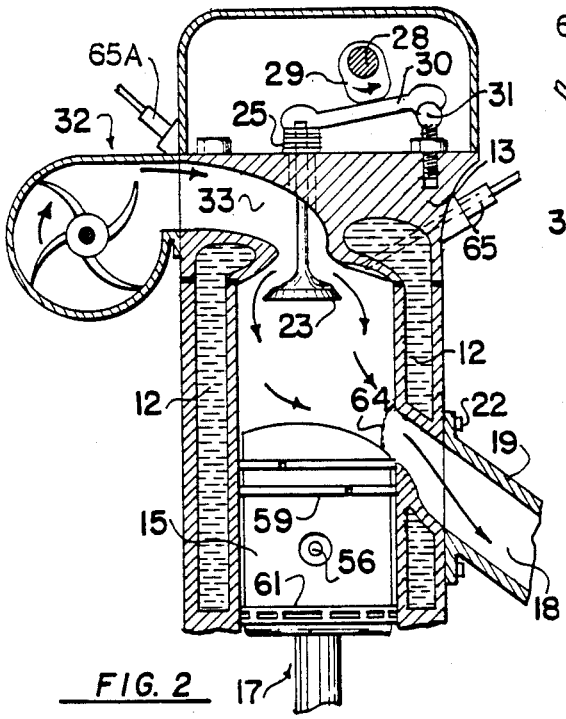
FIG. 2 is a view similar to FIG. 1 but showing the piston position at bottom dead centre with the intake valves fully opened.

In FIG. 1, the piston 15 is approaching the lower end of the power stroke. The exhaust port is partially open and the scavenging valve is just beginning to open. In FIG. 2, the piston is at the lower end of the power stroke with the exhaust port 18 being fully uncovered and air passing through the now fully opened scavenging or inlet valves, being supplied in sufficient volume by the blower assembly 32, to complete scavenge the exhaust gases through the exhaust port facilitated by the common angle of the piston head crown at this point and downwardly inclining exhaust port 18 and exhaust conduit 19.

Figure 3:
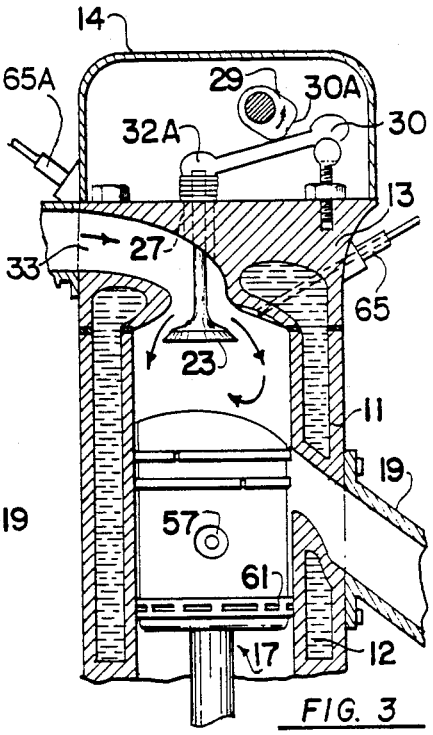
FIG. 3 is a view similar to FIG. 1 but showing the exhaust port covered by the piston at the beginning of the compression stroke with the intake valves still partly opened.

In this position, the piston is at the bottom dead centre and in FIG. 3 it is commencing to move upwardly on the compression stroke having covered the exhaust port 18 although the scavenging valve is still slightly open to ensure that a full charge of air is supplied within the combustion chamber 52.

Figure 4:
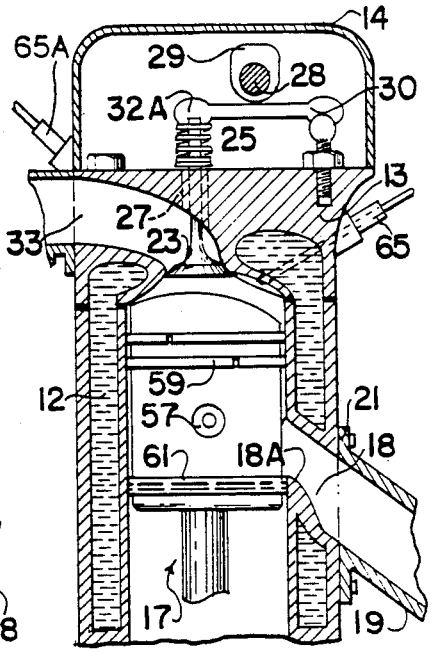
FIG. 4 is a view similar to FIG. 1 but showing the piston position at top dead centre of its compression stroke.

The scavenging or intake valve 23 now closes as the piston continues to move upwardly on the compression stroke to the top dead centre position as shown in FIG. 4. With the piston at this position, it will be noted that the aforementioned oil scraper ring 61 always remains below the lower edge 18A of the exhaust port so that the lubricating oil cannot escape through this port.

In gasoline engines, a few degrees before the piston covers the exhaust port and while the scavenging valves are still partly open, a metered spray of gasoline fuel is injected via a timed fuel injector assembly 65A installed at the scavenging valve manifold of each cylinder. The atomized fuel is mixed with the fresh air charge entering the cylinder to be compressed.

In diesel engines, a few degrees before the piston reaches its top dead centre position, a metered, atomized spray of diesel fuel is injected into the combustion chamber by a conventional fuel injector assembly 65. The fuel is ignited by the highly compressed air in the combustion chamber.

The ignited fuel and highly compressed air mixture expands and pushes the moving piston downwardly performing the power or expansion stroke to the position shown in FIG. 1 and the cycle of operation is repeated again and again.

It is to be noted that the scavenging valves 23 are of relatively large diameter to ensure that the air supplied to cylinders 52 is sufficient to completely scavenge and charge its cylinders every time the piston reaches the bottom of its stroke.

It is to be noted further that the scavenging valves 23 are opened and closed at the correct timing in relation to the piston degrees of travel. In order to achieve this, cam lobes 29 of the cam shaft 28 have a wide area of contact 30A and is designed to correctly time the duration of opening and closing of its scavenging valves 23 in relation to the piston degrees of travel. The scavenging valves 23, the rockers 30 and cam lobes 29 of the camshaft 28 are mechanically contacting one another and are all assembled upon the cylinder head. The camshaft 28 is mechanically driven by the crankshaft by means of gears and chain or cogged belt in a conventional manner.

Reference should be made to the novel design of the piston assembly illustrated in detail in FIG. 5. The piston is preferably formed from aluminum alloy and includes a piston head 44, a piston head crown and a surrounding cylindrical skirt portion 46.

As discussed previously, another very important point to be moved is the piston assembly shown in a fragmentary form as in FIG. 5, having a novel design features that controls and reduces lubricating oil problems especially if a constant pressure lubrication system is utilized in a two-cycle engine. The novel design features of the piston assembly are: the head 45 is dome shaped to facilitate the flow of the scavenging exhaust gases, a pair of compression rings 59 and a pair of sealing caps 57 installed at both ends of the piston bosses. For safety of operation these sealing caps 57 are secured by brazing a pin 56 that extends freely through the wrist pin 54 which is hollow. The sealing caps 57 are installed at each outer end of the piston bosses 58 to prevent any amount of the lubricating oil from being discharged therethrough.

Another important feature of the piston assembly to be noted is the oil scraper ring 61 which is installed close to the base of the piston skirt with oil return holes 63, the function of which is to prevent any amount of lubricating oil from being discharged to the exhaust ports 18 and that said oil scraper 61 always remains below the lower side 18A of the exhaust port when the piston is in the top dead centre position of its stroke.

The exhaust port 18 is located in the side of the cylinder wall adjacent the bottom dead centre position of the piston, the design of which is inclining downwardly and outwardly and is covered and uncovered by the piston, the design of which is to facilitate the flow of exhaust gases more freely into the atmosphere.

Figure 6:
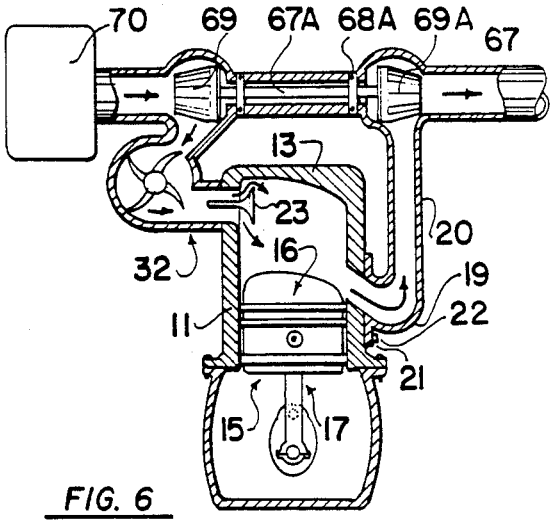
FIG. 6 is a schematic side elevation partially sectioned showing a turbo charger connected to the engine.
Figure 7:
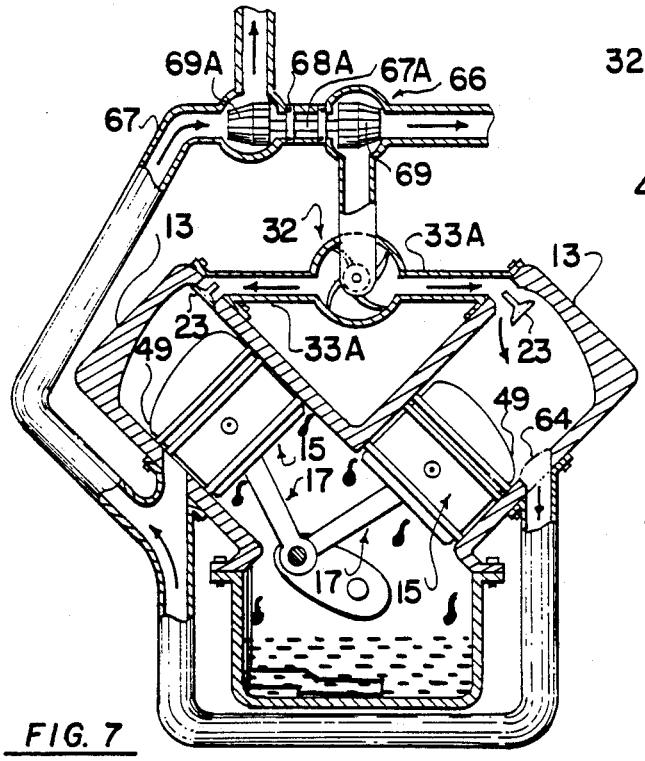
FIG. 7 is a view similar to FIG. 6 but showing a V-type configuration.

As mentioned previously, this invention is suitable for use with single or multi-cylinders either inline or V-type configuration being shown schematically in FIGS. 6 and 7 respectively.

It will also be appreciated that the air blower assembly 32 can be used with all configurations or alternatively, a turbo charger and air blower combination connected in series can be utilized as shown schematically in FIG. 7 collectively designated 66.

Figure 10:
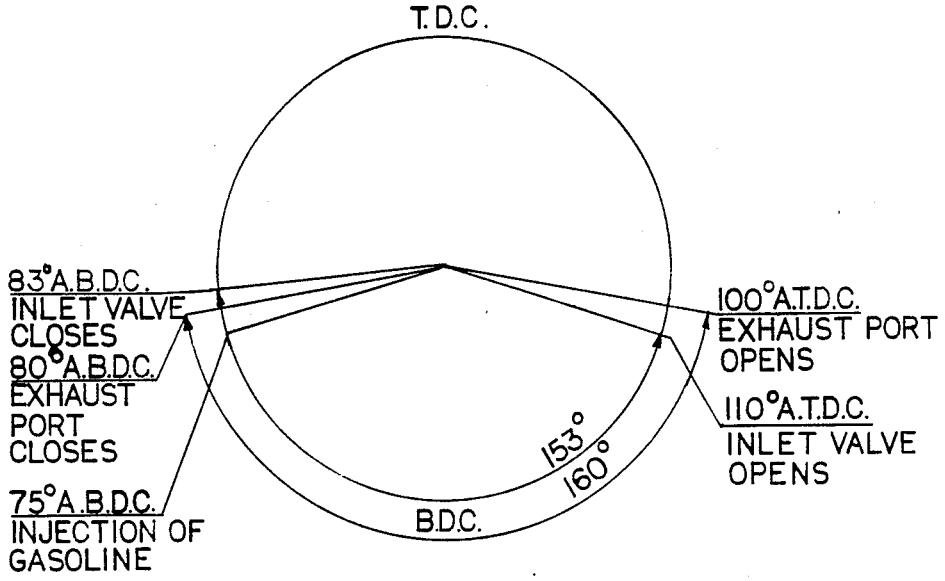
FIG. 10 is an example of the valve and exhaust port timing diagram of the engine.

Finally, reference should be made to FIG. 10 which shows the scavenging valves and exhaust port timing diagram.

The width of the cam lobe 30A is such that the inlet and scavenger valve opens approximately 110° after top dead centre and closes approximately 83° after bottom dead centre so that it remains open through approximately 153°.

The position of the exhaust port relative to the piston is such that the piston uncovers the exhaust port at approximately 100° after top dead centre and covers or closes the exhaust port at approximately 80° after bottom dead centre so that the exhaust port remains uncovered through approximately 160°. The relationship between the exhaust port opening and the inlet-and-scavenger valve opening is such that there is approximately a 10° dwell in which the inlet-and-scavenger valve remains closed after the initial opening of the exhaust port. The inlet-and-scavenger valve remains open approximately 3° after the exhaust port is fully covered or closes.

The cam lobe provides the necessary control for the opening, closing and duration of opening of the inlet-and-scavenger valves and the piston position controls the exhaust port opening, closing and duration of opening of the exhaust port. In gasoline engines, metered atomized gasoline fuel is injected approximately 75° after bottom dead centre, approximately 5° before the exhaust port is fully covered.

Since various modifications can be made in my invention as hereinabove described, and many apparently widely different embodiments of the same made within the spirit and scope of the claims without departing from such spirit and scope, it is intended that all matters contained in the accompanying specification shall be interpreted as illustrative only, and not in a limiting sense.

I claim:

1. In a two-stroke supercharged multi-cylinder internal combustion engine, with inline or V-type configuration and including a recirculating type constant pressure lubrication system; comprising in combination a cylinder block having cylinder bores formed therein, a cylinder head on the upper end of the cylindrical bores and closing same and defining a combustion chamber at the upper end of each cylindrical bore, a piston assembly in each of said bores including a piston having a domed head and a connecting rod operatively connected to said piston for reciprocating same between top dead centre and bottom dead centre, a crankshaft mounted for rotation at the base of said block, said connecting rods being operatively connected to said crankshaft and an oil pan enclosing the lower end of the cylinder bores and said crankshaft, said cylinder head including a camshaft mounted for rotation thereon and being operatively connected to said crankshaft, at least two inlet-and-scavenger valves mounted on said cylinder head and being operatively connected with said combustion chamber of each of said cylindrical bores, a rocker arm operatively mounted on said cylinder head and operatively engaging said inlet-and-scavenger valve by one end thereof, a cam lobe for each rocker arm formed on said cam shaft operatively connected with the other end of said rocker arm, said cam lobes having a wide area of contact with said rocker arm to control the opening, closing and duration of opening of said inlet-and-scavenger valve and exhaust port located in the lower side of the cylinder walls of the cylinder bores inclining downwardly and outwardly through the cylinder walls and being covered and uncovered by the reciprocating piston passing thereby, the improvement wherein the cam lobe opens said inlet-and-scavenger valve at approximately 110° after top dead centre and closes said inlet-and-scavenger valve at approximately 83° after bottom dead centre thereby maintaining said inlet-and-scavenger valve open through approximately 153°.

2. The invention according to claim 1 in which said piston uncovers said exhaust port approximately 100° after top dead centre and closes said exhaust port approximately 80° after bottom dead centre whereby said exhaust port is uncovered through approximately 160°.

3. The invention according to claim 2 wherein the inlet-and-scavenger valve opens approximately 10° after the exhaust port opens and closes approximately 3° after said exhaust port closes.

4. In a two-stroke supercharged multi-cylinder internal combustion engine, with inline or V-type configuration and including a constant pressure lubrication system; comprising in combination a cylinder block having cylinder bores formed therein, a cylinder head on the upper end of the cylindrical bores and closing same and defining a combustion chamber at the upper end of each cylindrical bore, a piston assembly in each of said bores including a piston having a domed head and a connecting rod operatively connected to said piston for reciprocating same between top dead centre and bottom dead centre, a crankshaft mounted for rotation at the base of said block, said connecting rods being operatively connected to said crankshaft and an oil pan enclosing the lower end of the cylinder bores and said crankshaft, said cylinder head including a camshaft mounted for rotation thereon and being operatively connected to said crankshaft, at least two inlet-and-scavenger valves mounted on said cylinder head and being operatively connected with said combustion chamber of each of said cylindrical bores, a rocker arm operatively mounted on said cylinder head and operatively engaging said inlet-and-scavenger valve by one end thereof, a cam lobe for each rocker arm formed on said camshaft operatively connected with the other end of said rocker arm, said cam lobes having a wide area of contact with said rocker arm to control the opening, closing and duration of opening of said inlet-and-scavenger valve and exhaust port located in the lower side of the cylinder walls of the cylinder bores inclining downwardly and outwardly through the cylinder walls and being covered and uncovered by the reciprocating piston passing thereby, the improvement wherein the piston uncovers said exhaust port approximately 100° after top dead centre and covers said exhaust port approximately 80° after bottom dead centre whereby said exhaust port is opened through approximately 160°.

5. The invention according to claim 1 in which said piston assembly includes means to control and reduce the escape of lubricating oil therepast, said means including said piston assembly having a domed piston head crown, a piston skirt extending therefrom, wrist pin bosses formed in said skirt below said domed head, sealing caps installed in adjacent the outer end of each of said wrist pin bosses, to prevent the escape of oil therepast, a wrist pin mounted in said wrist pin bosses and operatively connecting said connecting rod to said piston, at least two compression piston rings situated in spaced and parallel grooves in the head of said piston above said wrist pin bosses and at least one oil scraper ring mounted within an annular groove around the skirt of said piston below said wrist pin bosses, drain holes extending from said groove through said skirt to reduce the escape of lubricating oil through said exhaust port, said oil scraper ring always remaining below the lowermost edge of said exhaust port when said piston is at top dead centre.

6. The invention according to claim 2 in which said piston assembly includes means to control and reduce the escape of lubricating oil therepast, said means including said piston assembly having a domed piston head crown, a piston skirt extending therefrom, wrist pin bosses formed in said skirt below said domed head, sealing caps installed in adjacent the outer end of each of said wrist pin bosses, to prevent the escape of oil therepast, a wrist pin mounted in said wrist pin bosses and operatively connecting said connecting rod to said piston, at least two compression piston rings situated in spaced and parallel grooves in the head of said piston above said wrist pin bosses and at least one oil scraper ring mounted within an annular groove around the skirt of said piston below said wrist pin bosses, drain holes extending from said groove through said skirt to reduce the escape of lubricating oil through said exhaust port, said oil scraper ring always remaining below the lowermost edge of said exhaust port when said piston is at top dead centre.

7. The invention according to claim 3 in which said piston assembly includes means to control and reduce the escape of lubricating oil therepast, said means including said piston assembly having a domed piston head crown, a piston skirt extending therefrom, wrist pin bosses formed in said skirt below said domed head, sealing caps installed in adjacent the outer end of each of said wrist pin bosses, to prevent the escape of oil therepast, a wrist pin mounted in said wrist pin bosses and operatively connecting said connecting rod to said piston, at least two compression piston rings situated in spaced and parallel grooves in the head of said piston above said wrist pin bosses and at least one oil scraper ring mounted within an annular groove around the skirt of said piston below said wrist pin bosses, drain holes extending from said groove through said skirt to reduce the escape of lubricating oil through said exhaust port, said oil scraper ring always remaining below the lowermost edge of said exhaust port when said piston is at top dead centre.

8. The invention according to claim 4 in which said piston assembly includes means to control and reduce the escape of lubricating oil therepast, said means including said piston assembly having a domed piston head crown, a piston skirt extending therefrom, wrist pin bosses formed in said skirt below said domed head, sealing caps installed in adjacent the outer end of each of said wrist pin bosses, to prevent the escape of oil therepast, a wrist pin mounted in said wrist pin bosses and operatively connecting said connecting rod to said piston, at least two compression piston rings situated in spaced and parallel grooves in the head of said piston above said wrist pin bosses and at least one oil scraper ring mounted within an annular groove around the skirt of said piston below said wrist pin bosses, drain holes extending from said groove through said skirt to reduce the escape of lubricating oil through said exhaust port, said oil scraper ring always remaining below the lowermost edge of said exhaust port when said piston is at top dead centre.

9. The invention according to claim 1 in which said exhaust port is provided with a rectangular configuration and inclines downwardly and outwardly upon the lower side of said cylinder wall, said exhaust port being covered and uncovered by said piston as it moves between top dead centre and bottom dead centre within said cylindrical bore.

10. The invention according to claim 1 in which includes an air blower component operatively connected to said engine and having an air intake opening and an air outlet, said air outlet being operatively connected to said inlet-and-scavenger valve to supply air in sufficient volume to charge and scavenge said cylinder.

11. The invention according to claim 2 in which includes an air blower component operatively connected to said engine and having an air intake opening and an air outlet, said air outlet being operatively connected to said inlet-and-scavenger valve to supply air in sufficient volume to charge and scavenge said cylinder.

12. The invention according to claim 4 in which includes an air blower component operatively connected to said engine and having an air intake opening and an air outlet, said air outlet being operatively connected to said inlet-and-scavenger valve to supply air in sufficient volume to charge and scavenge said cylinder.

13. The invention according to claim 1 in which includes a turbo charger and an air blower connected in series thereto, said turbo charger being operated by the exhaust gases of said engine, said turbo charger and air blower being operatively connected to said inlet-and-scavenger valves to supply air sufficient to charge and scavenge said cylinders.

14. The invention according to claim 4 in which includes a turbo charger and an air blower connected in series thereto, said turbo charger being operated by the exhaust gases of said engine, said turbo charger and air blower being operatively connected to said inlet-and-scavenger valves to supply air sufficient to charge and scavenge said cylinders.

15. The invention according to claim 5 in which said wrist pin is hollow and is bearingly engaged within said wrist pin bosses, a retainer pin secured between said sealing caps, said retainer pin extending freely through said hollow wrist pin, said retainer pin securely retaining said end caps in position spaced slightly inboard from the outer ends of said wrist pin bosses.

16. The invention according to claim 6 in which said wrist pin is hollow and is bearingly engaged within said wrist pin bosses, a retainer pin secured to between said sealing caps, said retainer pin extending freely through said hollow wrist pin, said retainer pin securely retaining said end caps in position spaced slightly inboard from the outer ends of said wrist pin bosses.

17. The invention according to claim 7 in which said wrist pin is hollow and is bearingly engaged within said wrist pin bosses, a retainer pin secured to between said sealing caps, said retainer pin extending freely through said hollow wrist pin, said retainer pin securely retaining said end caps in position spaced slightly inboard from the outer ends of said wrist pin bosses.

18. The invention according to claim 1 in which includes a recirculating type constant pressure lubrication system and in which lubricating oil is stored in the oil pan and being supplied to all the vital moving parts by means of the pressure lubricating pump which is driven by the crankshaft by means of gears, said lubrication system using a micronic oil filter to ensure that clean oil is supplied at all times to the critical moving parts.

19. The invention according to claim 1 in which said cam lobe includes a peripheral contact surface portion engageable with said inlet-and-scavenger valve and extending through approximately 153° of rotation thereby controlling the opening and closing of said valve and the duration of the opening and closing thereof in relation to the degree of piston travel when the exhaust port is covered and uncovered by said piston, said exhaust port being uncovered for approximately 160° and covered for approximately 200° of crank shaft rotation.

20. The invention according to claim 1 in which gasoline is injected by means of pre-timed injectors of a fuel injection system for injecting a metered amount of fuel into each inlet-scavenging valve of each cylinder at the proper time in relation to degrees of piston travel, said fuel being injected at the valve port of each cylinder approximately 8° before each inlet-scavenging valve closes on the compression stroke.

* * * * *